G. KINGSLEY.
WATER TUBE BOILER.
APPLICATION FILED OCT. 1, 1908.

939,031.

Patented Nov. 2, 1909.

Witnesses:
A. M. Bodge.
F. Martell.

Inventor
George Kingsley.
By his Attorney Wm Bodge.

UNITED STATES PATENT OFFICE.

GEORGE KINGSLEY, OF NEW YORK, N. Y.

WATER-TUBE BOILER.

939,031.  Specification of Letters Patent.  Patented Nov. 2, 1909.

Application filed October 1, 1908. Serial No. 455,631.

*To all whom it may concern:*

Be it known that I, GEORGE KINGSLEY, a citizen of the United States, and resident of New York city, borough of Brooklyn, in the county of Kings and State of New York, have invented certain new and useful Improvements in Water-Tube Boilers, of which the following is a specification.

This invention relates to new and useful improvements in water-tube boilers of the general character described in my prior patent No. 837,847, dated December 4th, 1906, and the objects of the improvements are to provide means for facilitating the purification of the water before it reaches the steam-generating tubes, to avoid the formation of scale therein, and to afford convenient means for the collection and discharge of such impurities or sediment.

A further object includes a construction whereby the steam is permitted to escape from the generating-tubes and adapted to be collected without unduly agitating the body of water in the boiler; and the invention also comprehends an arrangement of tubes particularly adapted for marine use, in which the action of the boiler is unaffected by the pitching or rolling action of the vessel.

Figure 1:
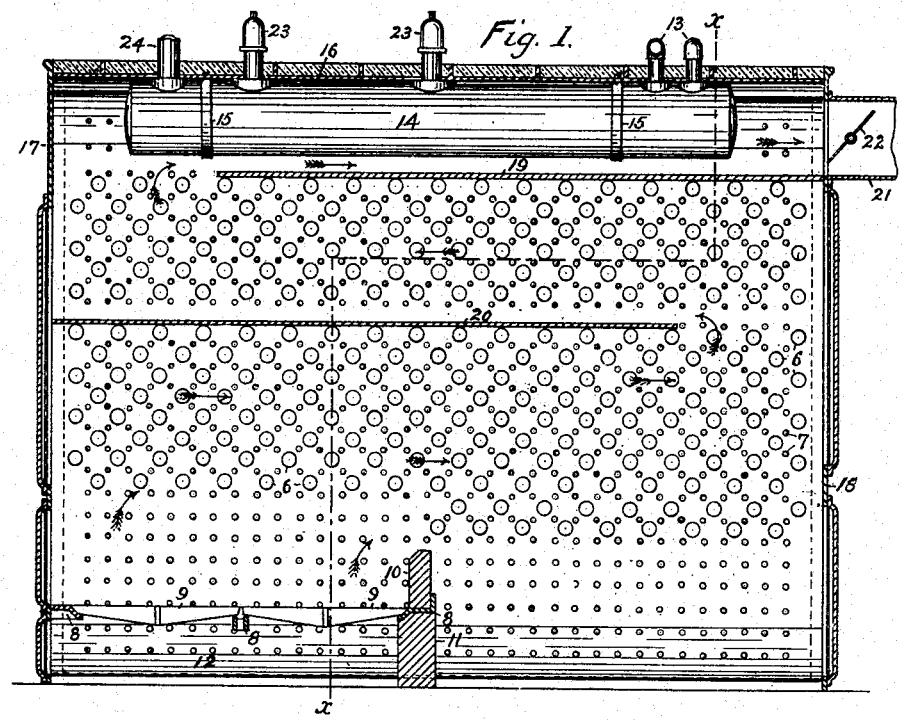
Figure 2:
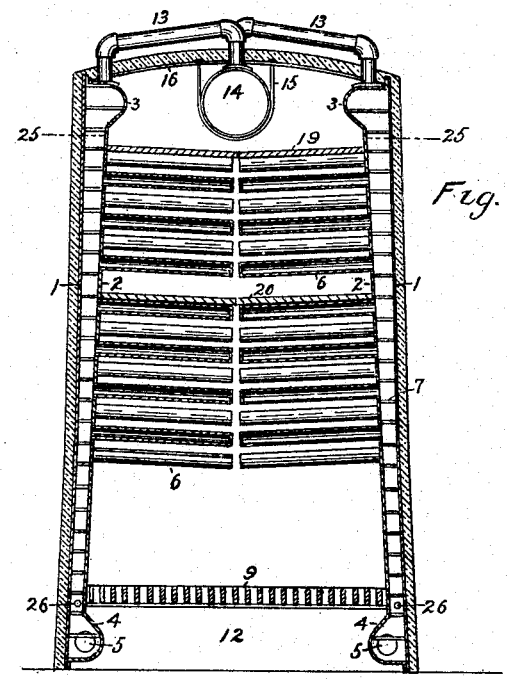

In describing the invention in detail, reference is had to the accompanying drawings, forming a part of this specification, and wherein like characters of reference are used to designate like parts throughout the several views, and in which;

Figure 1 is a longitudinal vertical section of the improved boiler embodying my invention; and Fig. 2 is a transverse vertical section of the same along the broken line *x x*, Fig. 1, and shown looking toward the front of the boiler.

The boiler is formed of a pair of oppositely-disposed side water-walls, each comprising an outer shell or metal plate 1 and an inner plate 2, connected together in the usual manner with riveted flanges and stay-bolts to withstand the required internal pressure. At the top and bottom, the inner plates are provided with inward swells to form reservoirs or chambers extending the full length of the water-walls and respectively indicated by 3 and 4, the upper chambers constituting steam-drums, and the lower chambers mud-drums for the collection of impurities or sediment deposited from the water. Cleaning-holes 5, having the usual removable covers, are provided in the opposite ends of the mud-drums, through which the sediment may readily be removed.

The opposing inner plates 2 are inwardly pitched toward the top, and secured to the plates, preferably at right angles thereto and with screw-threaded ends, are a series of inwardly-extending water-tubes 6, communicating at their outer ends with the water-walls, and having their inner ends closed, the opposing inner ends being sufficiently spaced apart to permit of their removal or replacement separately. Toward their free inner ends, the tubes have a downward inclination, and their spacing on the inner plates is in staggered relation with the stay-bolts to permit the free escape of the steam generated therein.

The stay-bolts are indicated by the numeral 7, and they are adapted to space and secure the plates in the usual manner by their screw-threads and riveted ends. Also secured to the inner plates are bearers 8, adapted to support the grate-bars 9, at the rear end of which is provided the upwardly-extending bridge-wall 10, and below the latter is formed the rear wall 11 of the ash-pit 12.

Between the mud-drums and the lower row of tubes, the inner and outer plates 1 and 2 are spaced apart substantially parallel with each other, but above the tubes, the space is uniformly enlarged toward the steam-drums to a sufficient extent to permit the escape of the aggregate steam from the superposed generating-tubes without unduly agitating the contained water in the water-walls. Pipe-connections 13 lead from the steam-drums 3 to the super-heater drum 14, the latter being supported by the hangers 15, or other suitable means, connected to the arch-plate 16, forming the roof of the boiler.

At the front and rear, the boiler is respectively provided with frames 17 and 18, which are connected to the plates of the side water-walls and are provided with the usual doors for communicating with the interior of the boiler. Supported upon the tubes within the boiler are the upper and lower baffle-plates, respectively indicated by 19 and 20 and spaced apart from the front and rear frames, to direct the flow of the heated products of combustion intimately among the tubes from the grate to the rear of the boiler, thence forward to the front, from which point the gases are returned rearward again to surround the superheater 14, and escape through the smoke-connection 21, the latter being provided with the damper 22. The superheater-drum 14 is provided with the usual mountings including the safety-valves 23 and the steam-delivery pipe 24, leading to the various points of consumption.

A suitable nonconducting covering, preferably an asbestos composition, is secured to the outer plates and roof of the boiler to prevent the excessive radiation of heat.

The water level in the boiler, as indicated by dotted lines 25, is carried sufficiently high to insure the complete charging of all the tubes, the downward inclination of which being adapted for the lateral sway thereof due to the average roll of the vessel, and it will be readily seen that the sway of the boiler from side to side will simply tend to alternately level the tubes, and prevent the discharge or water ends thereof from descending below its opposite or closed ends, obviating thereby the tendency to pocket the steam within the tubes and offering a resistance to its free escape, as would occur if the tubes were arranged in a normally level position within the boiler.

26 indicates the inlet connections for the feed-water, leading to the lower or cooler portion of the water-walls, which conforms more nearly with the temperature of the water supplied; this portion of the water-walls being also the freest from agitation permits the settlement of the contained solid impurities of the water. As the water flows into the boiler, it gradually rises beween the parallel inner and outer plates of the water-walls, which are suitably spaced apart to permit the heat from the fire-box to thoroughly penetrate and uniformly raise the contained water to a temperature adapted for the complete deposition of the salts held in solution, the precipitation of the same being assisted in this portion of the water-walls below the lower row of tubes by reason of the comparatively quiet state of the water therein. The water thus purified enters the tubes, where it is evaporated without leaving any deposit or scale, a common defect of the ordinary type of water-tube boiler.

It will be readily seen that by the arrangement of the heating surfaces as herein described, the water will be presented to the heated products of combustion in a thoroughly divided state, and in a manner to secure rapid evaporation with a minimum expense of fuel.

It is to be understood that while I illustrate and describe the preferred embodiment of the invention, it is susceptible of various changes as regards its form, proportions, detail construction, and arrangement of parts without departing from the essential spirit and scope or sacrificing any of the advantages of the invention.

What I claim as my invention and desire to secure by Letters Patent, is:—

1. In a water-tube boiler, a water-wall comprising an inner and an outer plate spaced apart and marginally secured together and provided with stay-bolts, one of said plates being shaped with projecting swells to form an upper steam-drum and a lower mud-drum, and a series of inwardly-extending tubes secured to said inner plate and communicating with the water-wall and having their inner ends closed.

2. In a water-tube boiler, a water-wall comprising an inner and an outer plate spaced apart and marginally secured together and provided with stay-bolts, one of said plates being shaped with projecting swells to form an upper steam-drum and a lower mud-drum, and a series of inwardly-extending and downwardly-inclining tubes secured to said inner plate and communicating with the water-wall and having their inner ends closed.

3. In a water-tube boiler, a water-wall comprising an inner and an outer plate spaced apart and marginally secured together and provided with stay-bolts, one of said plates being shaped with projecting swells to form an upper steam-drum and a lower mud-drum, a series of inwardly-extending tubes secured to said inner plate and communicating with the water-wall, said inner and outer plates being spaced apart substantially parallel with each other between the mud-drum and the lowermost tubes, and said space having a gradually-increasing distance between said lowermost tubes and the steam-drum.

4. In a water-tube boiler, the combination with fuel-burning means, of a water-wall comprising an inner and an outer plate spaced apart and provided with stay-bolts, one of said plates being shaped with projecting swells to form an upper steam-drum and a lower mud-drum, and a series of inwardly-extending tubes secured to the inner plate and communicating with the water-wall and having their inner ends closed.

5. In a water-tube boiler, the combination with fuel-burning means, of a pair of oppositely-disposed side water-walls comprising inner and outer plates, said inner plates being shaped at their top and bottom with inward swells to form upper steam-drums and lower mud-drums, said inner and outer plates being spaced apart, between the lowermost tubes and upper steam-drums, with gradually increasing distance, and a series of inwardly-extending tubes secured to the inner sheets and communicating with the water-walls and having their inner ends closed, substantially as described.

6. In a water-tube boiler, the combination with fuel-burning means, of a water-wall comprising an inner and an outer plate spaced apart and provided with stay-bolts, one of said plates being shaped with projecting swells to form an upper steam-drum and a lower mud-drum, and a series of inwardly-extending and downwardly-inclining tubes secured to the inner plate and communicating with the water-wall and having their inner ends closed.

7. In a water-tube boiler, the combination with a fuel-burning grate, of a pair of oppositely-disposed water-walls, each comprising an inner and an outer plate spaced apart and provided with stay-bolts, said inner plate of each water-wall being shaped with inwardly-projecting swells to form an upper steam-drum and a lower mud-drum, means for securing the grate to the inner plates adjacent the mud-drums, a series of inwardly-extending tubes secured to the inner plates and communicating with the water-walls and having their inner ends closed, said inner and outer plates of each water-wall being spaced apart substantially parallel with each other between the mud-drum and the lowermost tubes, and said space having a gradually-increasing distance between said lowermost tubes and the steam-drum.

8. In a water-tube boiler, the combination of a pair of oppositely-disposed side water-walls, each comprising an inner and an outer plate spaced apart and provided with stay-bolts, said inner plate of each water-wall being shaped with inwardly-projecting swells to form an upper steam-drum and a lower mud-drum, an upper and lower series of inwardly-extending tubes secured to said inner plates and communicating with the water-walls and having their inner ends closed, front and rear walls secured to said side water-walls, a fuel-burning grate secured to the inner plates of the side water-walls adjacent the front wall of the boiler, a boiler-roof secured to the side water-walls, a bridge-wall disposed in the rear of the grate, a baffle-plate disposed between the upper and lower series of tubes, a superheater drum disposed between the upper series of tubes and the boiler-roof and having steam-connections leading from the steam-drums of the side water-walls, a baffle-plate disposed between the upper series of tubes and the super-heater drum, and a smoke-connection leading from the rear wall of the boiler.

9. In a water-tube boiler, the combination of a pair of oppositely-disposed side water-walls, each comprising an inner and an outer plate spaced apart and provided with stay-bolts, said inner plate of each water-wall being shaped with inwardly-projecting swells to form an upper steam-drum and a lower mud-drum, an upper and a lower series of inwardly-extending and downwardly-inclining tubes secured to said inner plates and communicating with the water-walls and having their inner ends closed, front and rear walls secured to said side water-walls, a fuel-burning grate secured to the inner plates of the side water-walls adjacent the front wall of the boiler, a boiler-roof secured to the side water-walls, a bridge-wall disposed in the rear of the grate, a baffle-plate disposed between the upper and the lower series of tubes, a super-heater drum disposed between the upper series of tubes and the boiler-roof and having steam-connections leading from the steam-drums of the side water-walls, a baffle-plate disposed between the upper series of tubes and the super-heater drum, and a smoke-connection leading from the rear wall of the boiler.

Signed at New York in the county of New York and State of New York this 29th day of September A. D. 1908.

GEORGE KINGSLEY.

Witnesses:
F. MARTELL,
A. M. BODGE.